Figure 1:
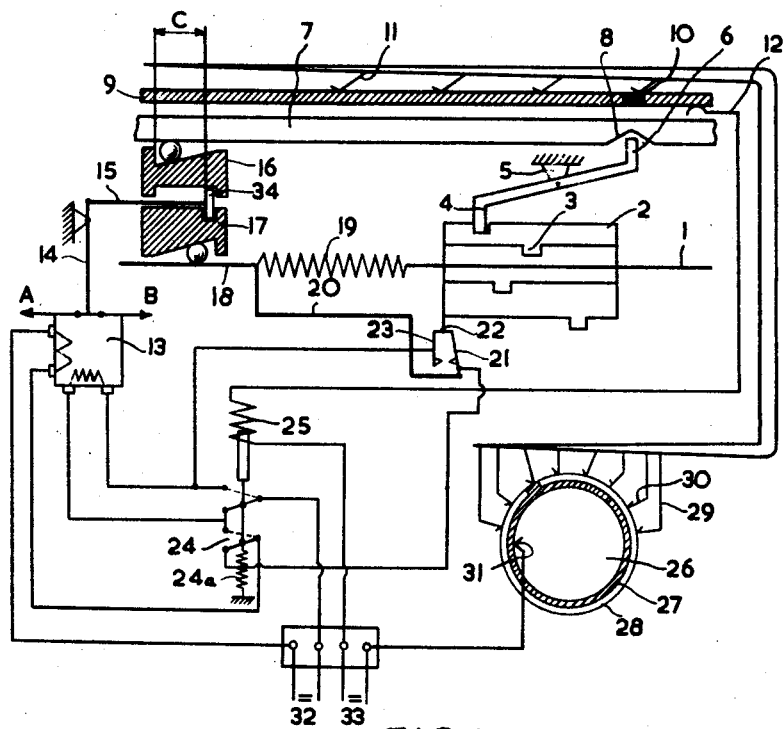

Dec. 18, 1962   G. H. WAARLÉ ET AL   3,069,611
SHAFT-POSITIONING MECHANISM
Filed April 19, 1957

INVENTORS,
GODFRIED HENDRIK WAARLÉ
WILHELMUS LAMBERTUS VERVEST
BY
AGENT

United States Patent Office 3,069,611
Patented Dec. 18, 1962

3,069,611
SHAFT-POSITIONING MECHANISM
Godfried Hendrik Waarlé and Wilhelmus Lambertus Vervest, Hilversum, Netherlands, assignors to North American Philips Company, Inc., New York, N.Y., a corporation of Delaware
Filed Apr. 19, 1957, Ser. No. 653,773
Claims priority, application Netherlands Apr. 25, 1956
4 Claims. (Cl. 318—467)

Shaft-positioning mechanisms for setting a shaft in one of a number of predetermined positions are known, in which the shaft is provided with a number of adjustable locking rings and with pawls which co-operate with these rings, are concentrically arranged about the shaft to be positioned and are selected one by one by a single selector wheel, the mechanism comprising a motor having two directions of rotation which can be chosen by an electrically controlled reversing switch, said motor driving, through a self-locking transmission gear, two freewheel clutches, each clutch being coupled to a shaft so that in one direction of rotation of the motor the selector wheel is adjusted and a pawl is chosen, whereas in the other direction of rotation the shaft to be positioned is driven until the selected pawl engages the associated locking ring, provision being made of a final switch in the supply circuit of the motor, which switch interrupts the motor current when the selected shaft-position is reached. In most cases, a number of such shaft-positioning mechanisms are used, since, for example in wireless tele-communication apparatus, a number of shafts must be positioned. In order to save motors and freewheel clutches, the positioning mechanisms are in most cases coupled, for example by gear wheels, in which event they must be provided with comparatively expensive overload clutches which, when the correct positioning has been achieved, completely disengage the shaft to be positioned from the driving mechanism, since it is highly improbable and never happens in practice that all the shafts are correctly positioned at the same instant. Another disadvantage consists in that, if one shaft to be positioned is spaced away from the other shafts, use must be made of a likewise expensive transmission gear comprising a plurality of gear wheels or a shaft, so that the arrangement or the accessibility of other component parts is impeded or made difficult, energy losses being also produced. With a view to the transmission, the shaft-positioning mechanisms should also lie in one plane as far as possible.

The invention relates to a shaft-positioning mechanism of the kind described above, which is particularly suited for use as a separate unit for driving a single shaft, and according to the invention the shaft-positioning mechanism is characterized in that, in this mechanism, provision is made, between the shaft to be positioned and the output of the freewheel clutch driving this shaft, of a non-disengageable clutch comprising a resilient member, the deformation of this resilient member in the loaded condition in excess of a predetermined value, which may be adjustable, controlling the final switch. This provides the advantage that the complicated overload clutch is replaced by a simple member, the resilient member itself supplying the directive force required to eliminate the inevitable play in the same direction always, as is necessary to achieve accurate positioning.

The resilient member may be a draw-spring or compression spring, a pneumatic or hydraulic buffer or an amount of resilient material, for example rubber or a synthetic resin; preferably, however, in one embodiment of the invention, this resilient member is a spiral spring.

It is also of advantage if, in a preferable embodiment of the invention, the transmission gear between the motor and the selector wheel includes a member having a certain degree of freedom, so that between the instant of reversal and subsequent starting of the motor and the instant at which the selector wheel begins to rotate, there is a certain time interval, the degree of freedom being chosen such that during this free movement the resilient member becomes unloaded. The advantage of this embodiment of the invention consists in that the pawls are controlled in the unloaded condition, while the final switch can be operated in a simple manner.

The final switch can be controlled by the deformation of the resilient member. Since this deformation may not be the same under all conditions, another member may be interposed between the resilient member and the final switch, so that this final switch is indirectly controlled. Thus, in a further preferred embodiment of the invention, as this other member use is made of a nut and a threaded spindle co-operating with the nut, the relative change in position of the nut with respect to the threaded spindle controlling the final switch.

Figure 2:
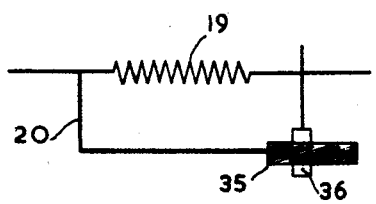

In order that the invention may readily be carried into effect, two embodiments thereof will now be described, by way of example, with reference to the accompanying drawings, in which:

FIG. 1 shows diagrammatically a shaft-positioning mechanism for positioning a single shaft, and FIG. 2 shows a modified form of the mechanism shown in FIG. 1.

Although in actual fact the shaft to be positioned rotates, so that the shaft-positioning mechanism includes rotating members, the figures show translatory movements in order to facilitate and simplify a description of the operation.

In FIG. 1, reference numeral 1 designates the shaft to be positioned which is provided with a number of locking rings 2 which can be moved relatively to the shaft. These locking rings have notches 3. Pawls 4, which are pivotally mounted at fixed points 5 and have projections 6, can co-operate with said notches. A selector wheel 7, shown here as a rod having a notch 8, is capable of movement to the left, so that each time other projections 6 of other pawls 4 can snap into the notch 8, and other pawls 4 can be rendered operative. The correct arrangement of the selector wheel, the pawls, the locking rings and the shaft in the case of rotation of the shaft to be positioned is shown in FIG. 2 of U.S. Patent No. 2,530,795 to Unk. To the selector wheel 7 there is rigidly secured a collector 9 made of electrically conductive material and having a piece of insulating material 10 arranged on it opposite the notch 8. Stationary sliding contacts co-operate with the collector at the side on which the insulating material is arranged. At the other side of the collector 9 there is a sliding contact 12. Between the selector wheel 7 and a shaft 15, which is driven by a motor 13 through a self-locking transmission gear 14, provision is made of a freewheel clutch 16. A similar freewheel clutch 17 which, however, acts in a direction opposite to that in which the freewheel clutch 16 operates, is interposed between the shaft 15 and a rod 18. This latter rod is connected to the shaft 1 to be positioned by means of a compression spring 19. To one end of the compression spring 19 there is connected a rod system 20 which operates a contact 21 of a final switch 22, the other contact 23 of this switch being rigidy connected to the shaft 1. A reversing switch 24, which is operated by a draw spring 24ᵃ and is capable of determining the direction of rotation of the motor 13, is electrically operated by a coil 25. Finally, there is a selector collector 26 which comprises an electrically conductive inner cylinder 27 and an insulating outer ring 28, a sector 29 of the conductive cylinder 27 projecting through the insulating ring 28. Sliding contacts 30 are provided on the outer side of the collector 26, a sliding contact 31 enabling a contact to be made with the inner side of the collector. A supply of electric current for the motor is connected at 32, a current supply capable of energizing the coil 25 being connected at 33.

The arrangement described operates as follows: When another position of the shaft 1 is required, the selector collector 26 is rotated so that the required position is set. As a result, the reversing switch 24 is switched over through a circuit comprising in succession the sliding contact 31, the projection 29, the sliding contact 30, the sliding contact 11, the sliding contact 12 and the coil 25, so that the motor 13 is switched into circuit and moves in direction B so that the shaft 15 is moved to the left. This shaft 15 has a stud 34 which is free to move to the left through a distance C. Consequently, the freewheel clutch 16 is not driven for a certain period of time. When the shaft 15 has travelled the distance C, the stud 34 drives the freewheel clutch, so that the selector wheel 7 is also moved to the left. The shaft 18, however, remains stationary, since the input of the freewheel clutch is free to move relatively to this shaft. As a result, the compression spring 19, which was loaded, is also enabled to release, so that the rod 20 moves the contact 21 and the final switch 22 is closed. As soon as the selector wheel 9 has assumed a position in which the insulating material 10 faces the sliding contact 11, which corresponds to the sliding contact 30 selected by the selector collector 26, the said circuit is interrupted; the coil 25 has no current supplied to it and the reversing switch 24 returns to the position shown in the figure. Now, however, the motor 13 starts to rotate in the reverse direction, since the final switch 22 has closed the current circuit of the motor. Consequently, the motor moves in direction A and the shaft 15 moves to the right. Now, the stud 34 immediately drives the freewheel clutch 17 and consequently the shaft 18 and hence the compression spring 19 and the shaft 1 to be positioned together with the locking rings 2 are moved to the right; however, the switch 22 remains closed. As soon as the new pawl chosen by the selector wheel 7 snaps into the notch 3, the shaft 1 is prevented from further movement; the compression spring 19 is compressed and the final switch 22 is opened, so that the motor has no current supplied to it and stops. The compression spring 19 tends to be released and to move the freewheel clutch 17 together with the stud 34 and the shaft 15 to the left; however, this is prevented by the fact that the transmission gear 14 between the motor and the shaft 15 is self-locking, for example is designed as a worm wheel and a worm. Consequently, when the shaft 1 is positioned, the compression spring 19 invariably exerts a thrust force to the right, so that the inevitable play between pawl and locking ring and also any play in any further transmission gears is invariably eliminated with the same force in the same direction, so that the positioning accuracy of the mechanism is high. Owing to the "angle" C (in actual fact the free movement C is an angle) the spring is released when the pawl is disengaged, so that this disengagement requires no energy and excessive loading and wear are avoided. A new pawl also engages in the unloaded condition. The shaft-positioning mechanism described is a single unit and can be mounted at any point required; there are only wire connections between the selector collector and the mechansim. The mechanism is also suited for use in machine tools and similar machines in which it is frequently required for a shaft to be accurately positioned in a number of preset positions.

The resilient member 19, which in the embodiment described, is a compression spring, may also be a draw spring; it may also be a hydraulic or pneumatic buffer or a member made of rubber or synthetic resin. In view of the fact that all the component parts of the mechanism are rotary, the resilient member preferably is a spiral spring. In this event, the "angle" C must exceed the tensioning angle of the spiral spring.

If it is required to dispense with the direct transmission between the end of the spring 19 and the contact 21 by means of the rod 20, which may be the case when the switch 22 is a so-called micro-switch, use may be made of the arrangement shown in FIG. 2, in which the rod 20 is connected to a screw 35 having a large pitch and co-operating with a nut 36. In this arrangement, the nut can operate the switch in a simple manner (not shown), for example by means of a cam. Obviously, the nut 36 may also be moved, in which event the threaded spindle 35 rotates.

What is claimed is:

1. A shaft-positioning mechanism for setting a shaft in a plurality of predetermined positions comprising a plurality of adjustable locking rings on said shaft, a plurality of pawls co-acting with said locking rings, means mounting said pawls and said locking rings concentrically about said shaft, a selector wheel for selecting predetermined pairs of locking rings and pawls, a reversible motor, a motor circuit including current supplying means, an electrically controlled reversing switch in said motor circuit controlling the direction of rotation of said motor, two freewheel clutches, a self-locking transmission gear, said motor driving said two freewheel clutches through said transmission gear, means coupling each of said clutches to said shaft whereby in one direction of rotation of said motor said selector wheel is positioned in a predetermined position and a pawl selected whereas in the other direction of rotation the shaft to be positioned is driven until the selected pawl co-acts with its associated locking ring, another switch in said motor circuit which interrupts the motor current when the selected shaft position is reached, and a non-disengageable resilient clutch positioned between one of said freewheel clutches and the shaft to be positioned, the deformation of said resilient clutch in the loaded condition thereof in excess of a predetermined value controlling the operation of said other switch.

2. A shaft-positioning mechanism as claimed in claim 1 wherein said resilient clutch is a helical spring.

3. A shaft-positioning mechanism as claimed in claim 1 wherein the transmission between the motor and the selector wheel includes a member having a certain freedom of movement, so that between the instant of reversal and subsequent starting of the motor and the instant at which the selector wheel begins to rotate there is a predetermined time interval, this free movement being chosen such that during this time interval the resilient member assumes the unloaded condition.

4. A shaft-positioning mechanism as claimed in claim 1 further comprising a nut and a threaded spindle co-acting therewith, the relative change of position of one of the ends of said resilient clutch with respect to the shaft to be positioned results in a relative change in position of said nut with respect to said threaded spindle co-acting therewith, said latter change controlling the operation of said other switch.

References Cited in the file of this patent

UNITED STATES PATENTS

| | | |
|---|---|---|
| 2,440,849 | Defandorf | May 4, 1948 |
| 2,702,609 | Frazier | Feb. 22, 1955 |